United States Patent [19]

Renslo et al.

[11] Patent Number: 5,446,890
[45] Date of Patent: Aug. 29, 1995

[54] SYSTEM FOR USING SUBSETS OF RULES APPLIED TO A DATABASE FOR UPDATING AND GENERATING THE RULE KNOWLEDGE BASE AND FORECASTS OF SYSTEM DEMAND

[75] Inventors: Erland Renslo, Roseville; Elizabeth M. Harker, Newcastle, both of Calif.; Clayton M. Collins, Blountville, Tenn.; Elaine R. Boliere, Auburn, Calif.; Douglas A. Anderson, Roseville, Calif.; Kimberly Gardner, Sacramento, Calif.

[73] Assignee: Hewlett-Packard Company, Palo Alto, Calif.

[21] Appl. No.: 328,934

[22] Filed: Oct. 25, 1994

Related U.S. Application Data

[63] Continuation of Ser. No. 128,388, Sep. 28, 1993, abandoned, which is a continuation of Ser. No. 800,656, Nov. 27, 1991, abandoned.

[51] Int. Cl.⁶ ............................................. G06F 17/30
[52] U.S. Cl. ...................................... 395/600; 395/20; 364/DIG. 1; 364/274.3; 364/282.1
[58] Field of Search .................. 395/600, 20; 364/408

[56] References Cited

U.S. PATENT DOCUMENTS

| | | | |
|---|---|---|---|
| 4,975,840 | 12/1990 | De Tore et al. | 364/401 |
| 4,992,942 | 2/1991 | Bauerle et al. | 364/420 |
| 5,099,424 | 3/1992 | Schneiderman | 364/413.02 |
| 5,131,087 | 7/1992 | Warr | 395/425 |
| 5,189,606 | 2/1993 | Burns et al. | 364/401 |
| 5,210,704 | 5/1993 | Husseiny | 364/551.01 |
| 5,233,513 | 8/1993 | Doyle | 354/401 |
| 5,237,498 | 8/1993 | Tenma et al. | 364/406 |
| 5,311,422 | 5/1994 | Loftin et al. | 364/401 |
| 5,317,606 | 5/1994 | Kinoshita et al. | 376/217 |

*Primary Examiner*—Thomas G. Black
*Assistant Examiner*—Wayne Amsbury

[57] ABSTRACT

A forecasting system predicts product demand. A database stores information related to the volume of orders for a plurality of products. A knowledge base stores rules relevant to the products. A single program interface accesses the database and the knowledge base, including access screen means for monitoring and for updating the database and the knowledge base, the single program interface also including access screen means for generating forecasts of the future product demand for the products.

8 Claims, 20 Drawing Sheets

PERFORM: Query   Next   Previous   Add   Update   Remove   Table   Screen
Searches the active database table.     1: general_prod_da table

GENERAL PRODUCT DATA

| | | Product Option | |
|---|---|---|---|
| Prod Number | ABC – 2 | Rolled Option | PLUS |
| Rolled Number | ABC – 1 | Supplying Div | xyz |
| Prod Line | PERIPHERAL | Backplane | NETWORK I/O |
| System Type | 1000 | Portfolio | COLOR |
| Model | SUPER | Sort level2 | FACTORY II |
| Sort Level1 | UNIX | BIG DOLLAR | YES |
| Sort Level3 | WEST COAST | | |
| Year-end Seas | LARGE | | |
| Prod Category | old with no system | | |
| Prod Manager | DAVID | | |
| Prod Desc | SCANNER | | |

FIG. 6

PERFORM: Query Next Previous Add Update Remove Table Screen ...
Searches the active database table.             2: special_data table

| | SPECIAL PRODUCT DATA | (Screen 2) |
|---|---|---|
| Product Number | Data Date 07/01/91 | |
| | 2005B Product Option | |
| Forcast Flag | Yes Market Pcnt Flag | Yes |
| Merlin Exception | No Automatically Fcst | Yes |
| On CPL Date | 02/01/83 OFF CPL Date | |
| List Price | 1,095.60 Dollar Category | TOP |
| Inactive Status | | |
| Comments | PROMO 10/91 - 2/92 | |

FIG. 7

PERFORM: Query  Next  Previous  Add  Update  Remove  Table  Screen
Searches the active database table.      2: special_prod_da table      (Screen 1)

SPECIAL PRODUCT DATA

Data Date 12/01/89    Prod Number 12005B    Prod Option

| | -12 | -11 | -10 | -9 | -8 | -7 | -6 | -5 | -4 | -3 | -2 | -1 | NOW |
|---|---|---|---|---|---|---|---|---|---|---|---|---|---|
| HISTORY | DS | DS | DS | DS | DS | DS | DS | DS | DS | DS | DS | DS | DS |
| Life Status | | | | | | | | | | | | | |
| Price Chg % | | | | | 20 | | | | | | | | |
| Transfer % | | | | | | | 119 | | | | | | |
| Bigdeal Units | | | | | | | | | | | | | |

| | Now | 1 | 2 | 3 | 4 | 5 | 6 | 7 | 8 | 9 | 10 | 11 | 12 |
|---|---|---|---|---|---|---|---|---|---|---|---|---|---|
| FUTURE | DS | DS | DS | DS | DS | DS | DS | DS | DS | DS | DS | DS | DS |
| Life Status | | | | | | | | | | | | | |
| Price Chg % | | | | | | | | | | | | | |
| Transfer % | | | | | | | | | | | | | |
| Bigdeal Units | | | | | | | | | | | | | |

FIG. 8

REVIEW FORECAST

| Data Date | 07/01/91 | | | Prod Number | 2005B | | | Prod Option | | | |
|---|---|---|---|---|---|---|---|---|---|---|---|
| MKT | AUG | SEP | OCT | NOV | DEC | JAN | FEB | MAR | APR | MAY | JUN | JUL |
| TOT | 40 | 44 | 44 | 40 | 40 | 40 | 40 | 40 | 40 | 40 | 40 | 40 |
| OEM | 23 | 25 | 25 | 23 | 23 | 23 | 23 | 23 | 23 | 23 | 23 | 23 |
| DEALER | 15 | 17 | 17 | 15 | 15 | 15 | 15 | 15 | 15 | 15 | 15 | 15 |
| TRADE | 1 | 1 | 1 | 1 | 1 | 1 | 1 | 1 | 1 | 1 | 1 | 1 |
| GOVT | 4 | 4 | 4 | 4 | 4 | 4 | 4 | 4 | 4 | 4 | 4 | 4 |
| I | -3 | -3 | -3 | -3 | -3 | -3 | -3 | -3 | -3 | -3 | -3 | -3 |

|  | TOT | OEM | DEALER | TRADE | GOVT | I |
|---|---|---|---|---|---|---|
| MARKET % | 100 | 37 | 48 | 14 | 1 | 0 |
| ACTUAL % | 56 | 21 | 25 | 9 | 7 | 0 |

MARKET % IS FOR PREVIOUS THREE MONTHS

*FIG. 9*

INCREASE/DECREASE REPORT BY BACKPLANE

| Product Num | Option | Unit Change | Net Dollar Change | Total$ Change |
|---|---|---|---|---|
| 2005B |    | -4 | -$3,002 |    |
| 2005B | 02 | -15 | -$2,577 |    |
|    |    | -19 |    | -$5,579 |
| 2006A |    | -7 | -$4,624 |    |
|    |    | -7 |    | -$4,624 |
| 2009A |    |    |    |    |
| 2009A | 01 | -27 | $22,008 |    |
|    |    | -20 | -$558 |    |
|    |    | -47 |    | -$22,566 |
| 2040C |    |    |    |    |
| 2040C | 03 | -17 | -$12,884 |    |
|    |    | -39 | $11,583 |    |
|    |    | -56 |    | -$1,301 |
| 2040D |    | 40 | $64,705 |    |
|    |    | 40 |    | $64,705 |
| 2042B |    | 8 | $13,793 |    |
| 2042B | 02 | 6 | -$1,170 |    |
|    |    | 14 |    | $12,623 |
| 2044A |    | 4 | $11,105 |    |
|    |    | 4 |    | $11,105 |
| GRAND TOTAL |    | -71 |    | $54,363 |

*FIG. 10*

MTD and YTD UNITS & K DOLLARS  STANDALONE FORECAST REPORT
CABLE PORTFOLIO PRODUCTS FOR 61 PRODUCT LINE(S)

| Product Num | Option Market | Nov | Dec | Jan | Feb | Mar | Apr | May | Jun | Jul | Aug | Sep | Oct | Total |
|---|---|---|---|---|---|---|---|---|---|---|---|---|---|---|
| 707A | | | | | | | | | | | | | | |
| | OEM #U | 0 | 0 | 0 | 0 | 0 | 0 | 0 | 0 | 0 | 0 | 0 | 0 | 0 |
| | OEM K$ | 0 | 0 | 0 | 0 | 0 | 0 | 0 | 0 | 0 | 0 | 0 | 0 | 0 |
| | DEALER #U | 8 | 4 | 5 | 3 | 3 | 4 | 4 | 4 | 4 | 4 | 4 | 4 | 51 |
| | DEALER K$ | 811 | 406 | 507 | 304 | 304 | 406 | 406 | 406 | 406 | 406 | 406 | 406 | 5174 |
| | TRADE #U | 0 | 0 | 0 | 0 | 0 | 0 | 0 | 0 | 0 | 0 | 0 | 0 | 0 |
| | TRADE K$ | 0 | 0 | 0 | 0 | 0 | 0 | 0 | 0 | 0 | 0 | 0 | 0 | 0 |
| | GOVT #U | 1 | 2 | 3 | 3 | 2 | 2 | 2 | 2 | 2 | 2 | 2 | 2 | 25 |
| | GOVT K$ | 0 | 0 | 0 | 0 | 0 | 0 | 0 | 0 | 0 | 0 | 0 | 0 | 0 |
| | I #U | 0 | 0 | 0 | 0 | 0 | 0 | 0 | 0 | 0 | 0 | 0 | 0 | 0 |
| | I K$ | 0 | 0 | 0 | 0 | 0 | 0 | 0 | 0 | 0 | 0 | 0 | 0 | 0 |
| | TOTAL #U | 9 | 6 | 8 | 6 | 5 | 6 | 6 | 6 | 6 | 6 | 6 | 6 | 76 |
| | TOTAL K$ | 811 | 406 | 507 | 304 | 304 | 406 | 406 | 406 | 406 | 406 | 406 | 406 | 5174 |

*FIG. 11A*

MTD and YTD UNITS & K DOLLARS　　　　　STANDALONE FORECAST REPORT

CABLE PORTFOLIO PRODUCTS FOR 61 PRODUCT LINE(S)

| Product Num | Option Market | Nov | Dec | Jan | Feb | Mar | Apr | May | Jun | Jul | Aug | Sep | Oct | Total |
|---|---|---|---|---|---|---|---|---|---|---|---|---|---|---|
| 708B | | | | | | | | | | | | | | |
| | OEM #U | 0 | 0 | 0 | 0 | 0 | 0 | 0 | 0 | 0 | 0 | 0 | 0 | 0 |
| | OEM K$ | 0 | 0 | 0 | 0 | 0 | 0 | 0 | 0 | 0 | 0 | 0 | 0 | 0 |
| | DEALER #U | 45 | 32 | 45 | 25 | 25 | 45 | 26 | 24 | 24 | 24 | 24 | 48 | 387 |
| | DEALER K$ | 4365 | 3104 | 4365 | 2425 | 2425 | 4365 | 2522 | 2328 | 2328 | 2328 | 2328 | 4556 | 37539 |
| | TRADE #U | 0 | 0 | 0 | 0 | 0 | 0 | 0 | 0 | 0 | 0 | 0 | 0 | 0 |
| | TRADE K$ | 0 | 0 | 0 | 0 | 0 | 0 | 0 | 0 | 0 | 0 | 0 | 0 | 0 |
| | GOVT #U | 4 | 4 | 4 | 4 | 4 | 4 | 4 | 4 | 4 | 4 | 4 | 4 | 48 |
| | GOVT K$ | 0 | 0 | 0 | 0 | 0 | 0 | 0 | 0 | 0 | 0 | 0 | 0 | 0 |
| | I #U | 0 | 0 | 0 | 0 | 0 | 0 | 0 | 0 | 0 | 0 | 0 | 0 | 0 |
| | I K$ | 0 | 0 | 0 | 0 | 0 | 0 | 0 | 0 | 0 | 0 | 0 | 0 | 0 |
| | TOTAL #U | 49 | 36 | 49 | 29 | 29 | 49 | 30 | 28 | 28 | 28 | 28 | 52 | 435 |
| | TOTAL K$ | 4365 | 3104 | 4365 | 2425 | 2425 | 4365 | 2522 | 2328 | 2328 | 2328 | 2328 | 4556 | 37539 |

*FIG. 11B*

FINAL DOLLAR REPORT BY BACKPLANE
IN K Net Dollars

| MARKET | DEC | JAN | FEB | MAR | APR | MAY | JUN | JUL | AUG | SEP | OCT | NOV | TOTAL |
|---|---|---|---|---|---|---|---|---|---|---|---|---|---|
| OEM | 77 | 80 | 71 | 74 | 77 | 71 | 74 | 76 | 70 | 72 | 75 | 67 | 883 |
| DEALER | 440 | 467 | 417 | 432 | 459 | 406 | 417 | 443 | 392 | 404 | 443 | 369 | 5089 |
| TRADE | 517 | 547 | 488 | 506 | 536 | 477 | 491 | 519 | 462 | 476 | 518 | 436 | 5972 |
| GOVT | 256 | 304 | 215 | 279 | 205 | 264 | 177 | 236 | 132 | 219 | 143 | 122 | 2553 |
| TRD+ GOVT | 773 | 851 | 703 | 785 | 741 | 741 | 668 | 755 | 594 | 695 | 661 | 558 | 8525 |
| II | 0 | 0 | 0 | 0 | 0 | 0 | 0 | 0 | 0 | 0 | 0 | 0 | 0 |
| III | 0 | 0 | 0 | 0 | 0 | 0 | 0 | 0 | 0 | 0 | 0 | 0 | 0 |

*FIG. 12*

| KNOWLEDGE BASE ATTRIBUTES ||
|---|---|
| INPUT ATTRIBUTES | PRICE CHANGE PERCENTS<br>PRODUCT ID<br>PRODUCT CATEGORY<br>INTRODUCTION DATE<br>DOLLAR CATEGORY<br>LIFECYCLE STATUS<br>SEASONALITY STATUS |
| INFERRED ATTRIBUTES | PRICE CHANGE CATEGORIES<br>SALES VOLATILITY CATEGORIES<br>SEASONAL EFFECT COEFFICIENTS |

*FIG. 16*

DATABASE

| GENERAL PRODUCT DATA | | | |
|---|---|---|---|
| CURRENT SPECIAL INFO-PRODUCTS | | | |
| HISTORIC/FUTURE SPECIAL INFO-PRODUCTS | | | |
| HISTORIC ORDER VOLUME DATA | | | |
| HISTORIC/FUTURE NET REVENUE DATA | | | |
| HISTORIC FORECASTING RESULTS | | | |
| DATE MADE | FINAL FORECAST 44 | MERLIN FORECAST 46 | TEST FORECAST |
| DISCOUNT TABLES FOR PRODUCT GROUPINGS | | | |
| CURRENT DATE | | | |
| METRICS CONFIGURATION TABLE FOR GRAPHICS | | | |
| FISCAL YEAR QUOTA TABLES IN UNITS | | | |
| DIVISION SPECIFIC CONFIGURATION INFO | | | |

*FIG. 19*

SYSTEM FOR USING SUBSETS OF RULES APPLIED TO A DATABASE FOR UPDATING AND GENERATING THE RULE KNOWLEDGE BASE AND FORECASTS OF SYSTEM DEMAND

CROSS REFERENCE TO RELATED APPLICATION

This application is a continuation of application Ser. No. 08/128,388, filed Sep. 28, 1993, now abandoned, which was a continuation of patent application Ser. No. 07/800,656, filed Nov. 27, 1991, now abandoned.

BACKGROUND OF THE INVENTION

This invention relates generally to forecasting methods, and more specifically to the adaptation of an expert system in order to forecast product demand for a diverse product line.

Forecasting a factory's product demand using conventional forecasting techniques is a difficult and time-consuming task. However, forecasting is considered to be very necessary in the world of manufacturing where customers often order products long after the lead time for procuring raw material has passed. In order to supply products on schedule, forecasting has come to play a major role in factory operations such as initial planning, scheduling, and financial management.

Conventional forecasting techniques have typically been deficient in a number of ways. For example, the forecasting process was difficult to improve because the forecaster did not have the means to easily experiment with and incorporate new algorithms. Also, many forecasting tasks were manually intensive and a large number of products had to be forecasted. This left little time for improving the forecasting process.

To the extent forecasting was automated, it dealt exclusively with historical order information and could not benefit from up-to-the-minute real-world knowledge. In addition, there was no systematic and automated method for storing and updating product information. Such product information was typically stored in the forecaster's head or written down on scratch paper. Without being able to capture and understand this expert knowledge, it has been virtually impossible to improve the forecasting process.

The order history trend analysis was typically done with intuitive reasoning. Without a systematic method of performing trend analysis, there was no consistent way to generate product forecasts and compare predictions.

BRIEF SUMMARY OF THE INVENTION

In order to overcome the deficiencies of the foregoing rudimentary forecasting techniques, the invention provides a more efficient and complete database with certain data transfers automated, and with an improved universal programmatic interface which provides access to both the database as well as a knowledge base and a statistical graphics software package.

Thus, the invention provides for the integration of a knowledge base with an automatically updated database which can both be modified by a user through a single program interface using a minimal number of access screens in order to create an optimized forecast analysis environment and achieve accelerated forecasting results. Future demands for individual products or variously grouped products can be forecast in terms of unit volume and net revenues, and the forecast analyst can generate related reports and graphical displays of forecast date and metrics, and has the capability to review prior forecasts and the related product data upon which they were based, simulate additional test forecasts based on proposed revisions incorporated in a test knowledge base, and compare such test forecasts with the prior reference forecasts in order to make changes to improve the expertise of the knowledge base and ultimately the accuracy of the predictions.

DESCRIPTION OF THE DRAWINGS

FIG. 6 shows a menu screen for viewing/changing general product information in the database;

FIG. 7 shows a menu screen for viewing/changing various types of special product information in the database;

FIG. 8 shows a menu screen for viewing/changing additional types of special product information in the database;

FIG. 9 shows an access screen used for reviewing past forecasts;

FIG. 10 shows an exemplary increase/decrease report showing the change in units and net dollars between a current forecast and the previous month's forecast;

FIG. 11 shows an exemplary standalone forecast report made for each month in the twelve-month period ahead;

FIG. 12 shows an exemplary final dollar report for a group of products, broken down by market distribution;

FIG. 16 is a table showing an exemplary list of knowledge base attributes presently incorporated in the invention;

FIG. 19 shows the various types of information stored in the database of the present invention.

DETAILED DESCRIPTION OF THE BEST MODE

The forecasting system of the present invention was developed to forecast a factory's product demand for the upcoming year, by showing the forecasted demand for each individual month. In order to establish a calendar framework for understanding the invention, and in accordance with a presently preferred embodiment of the invention, a forecast made during the current month covers the subsequent twelve individual months. Of course, the period covered is changeable—it could begin with the current month and cover each of the subsequent five months (a six-month forecast), or it could cover each quarterly period for the subsequent two years. The invention is not limited to any particular total length of forecast or any particular length for its component time periods.

Figure 14:
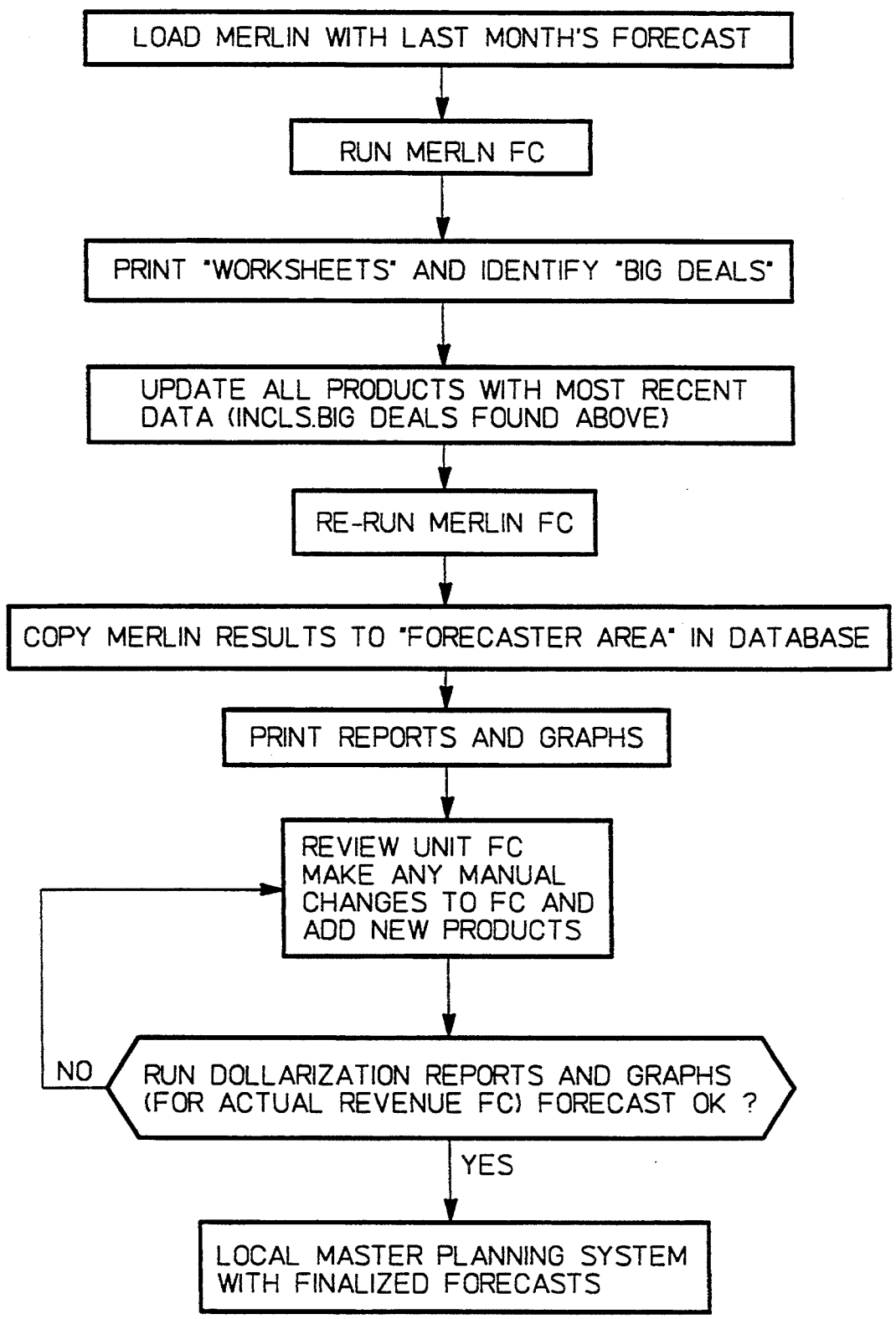
FIG. 14 is a flow chart for the forecasting process of the present invention.
Figure 15:
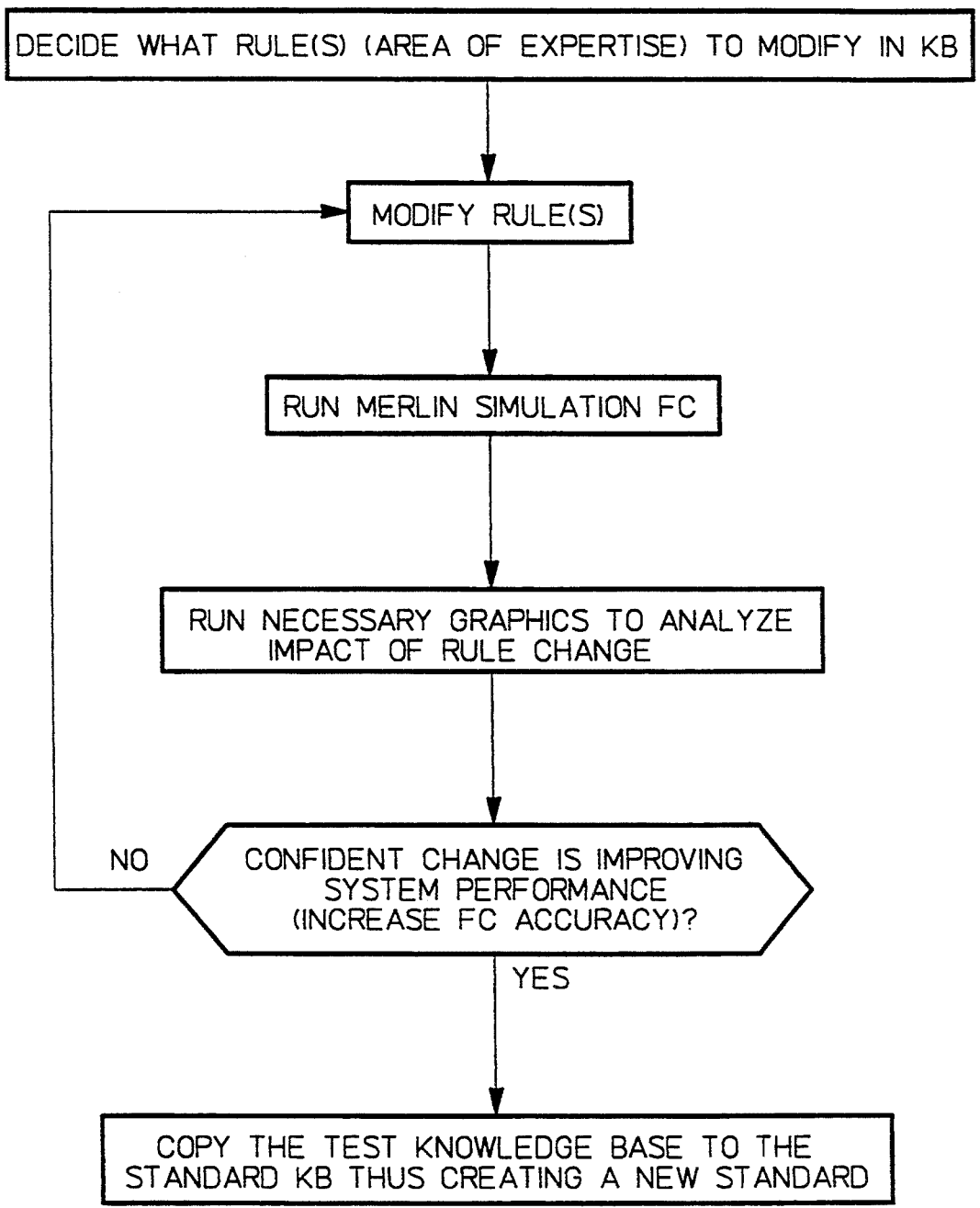
FIG. 15 is a flow chart for the forecasting improvement process of the present invention.
Figure 17:
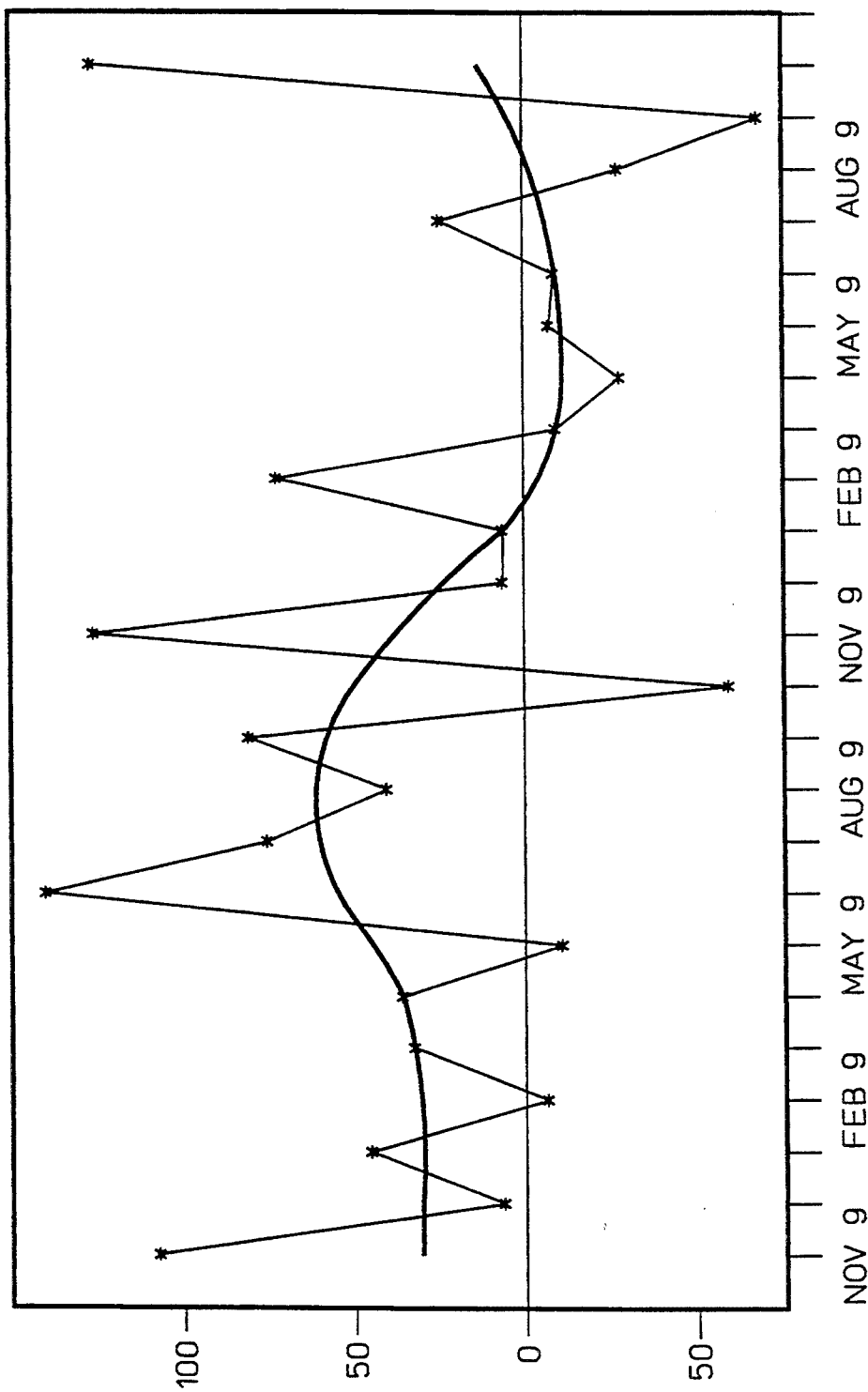
FIG. 17 shows an exemplary graphical plotting in both literal and smoothed form showing the percent forecast error for a sequence of forecasts made each month at time T minus one (one month in advance) during a two year period.

This forecasting system contains an embedded knowledge bases such as standard knowledge base 20 which enables it to make predictions using the latest reasoning process of the forecasting experts on updated special information currently available for each of the products (see the flow chart of FIG. 14). In addition it features a simulation mode which enables the forecasters to improve the system by allowing them to test new forecasting algorithms in a test knowledge base 22 (see the flow chart of FIG. 15) and analyze the results via metrics displayed in graphical format (see FIG. 17). This alternative provides an easy mechanism to experiment with the knowledge base and improve it through "what if" analysis. Finally, forecasts created by this system can be interrogated to obtain a clear understanding of how results were generated.

Figure 1:
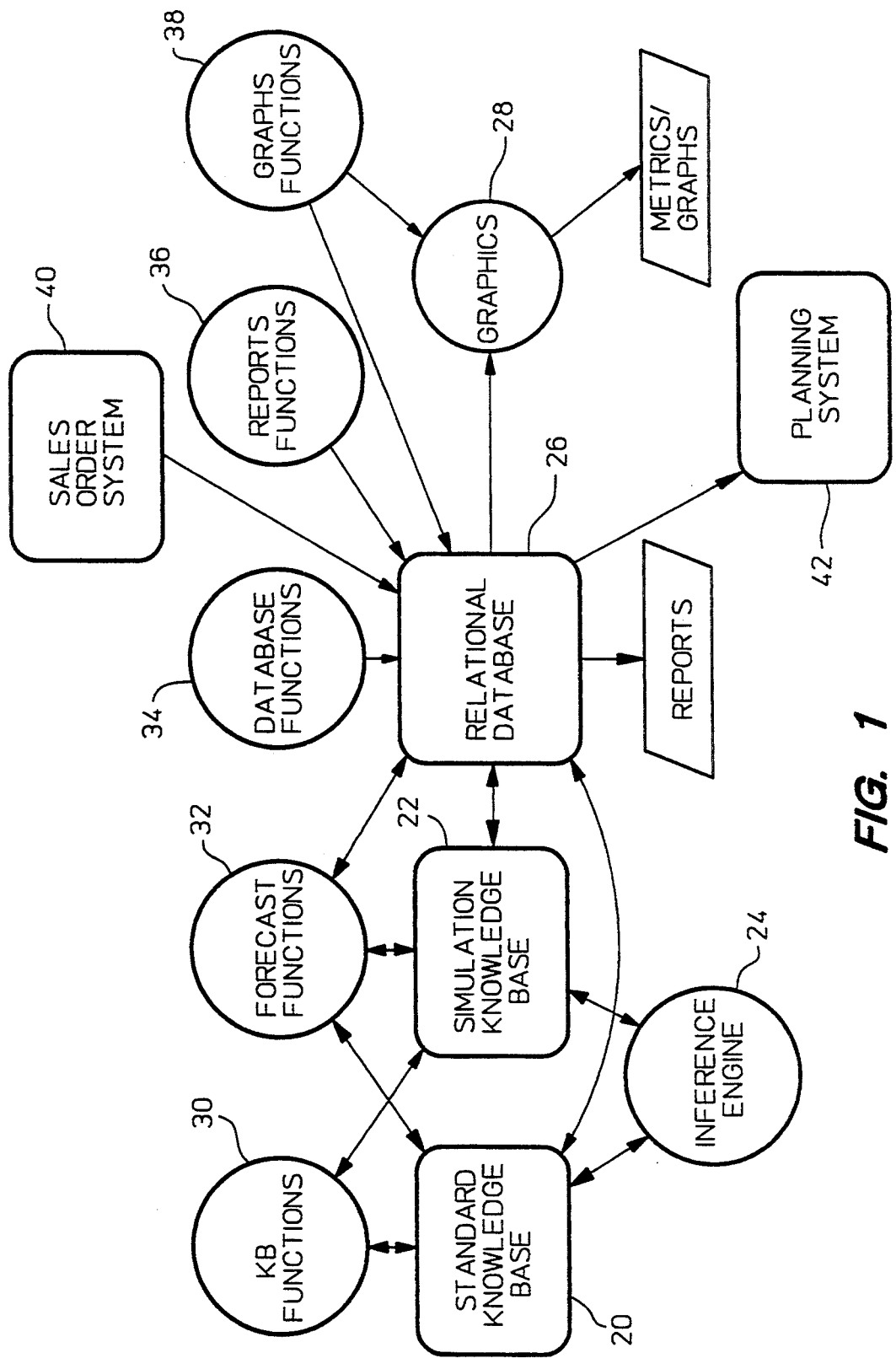
FIG. 1 is a functional block diagram showing a presently preferred embodiment of the invention.
Figure 2:
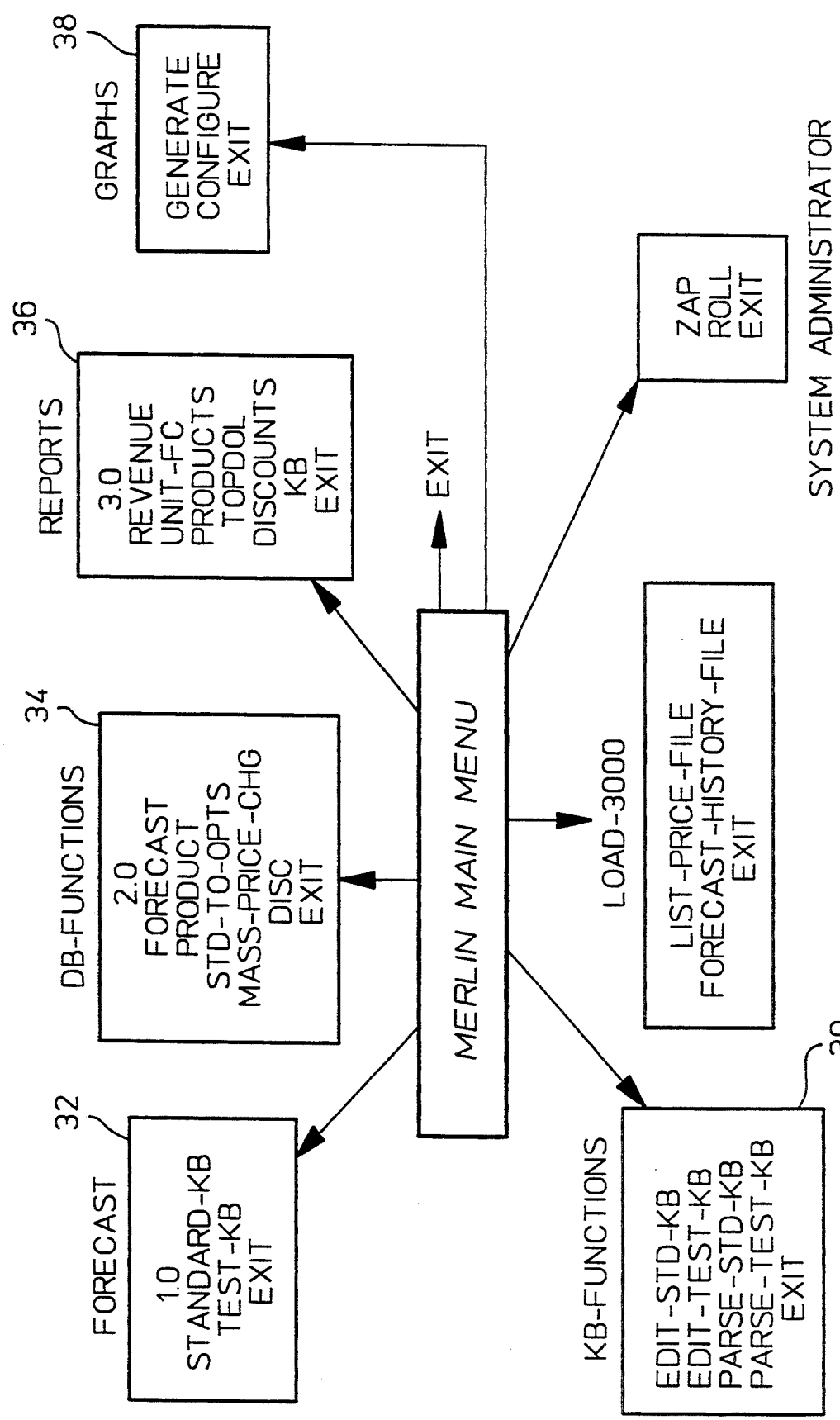
FIG. 2 is a schematic diagram showing a functionality mapping of the main access screen.

The major components of the system and method of the present invention, sometimes referred to as the Merlin System in the drawings, are shown in FIG. 1. In its preferred form, the forecasting system runs under a Hewlett-Packard implementation of the UNIX operating system on an HP 9000 workstation.

The user interface is a single program interface which allows access to the following: an inference engine 24 for a knowledge base system, such as one based on software from Software Architecture Engineering of Arlington, Va.: a relational database system 26, such as one based on software from Informix Software, Inc. of Menlo Park, Calif.; and a graphics system 28 such as one based on a statistical software package called Splus from Statistical Sciences, Inc., of Seattle, Wash.

Figure 3:
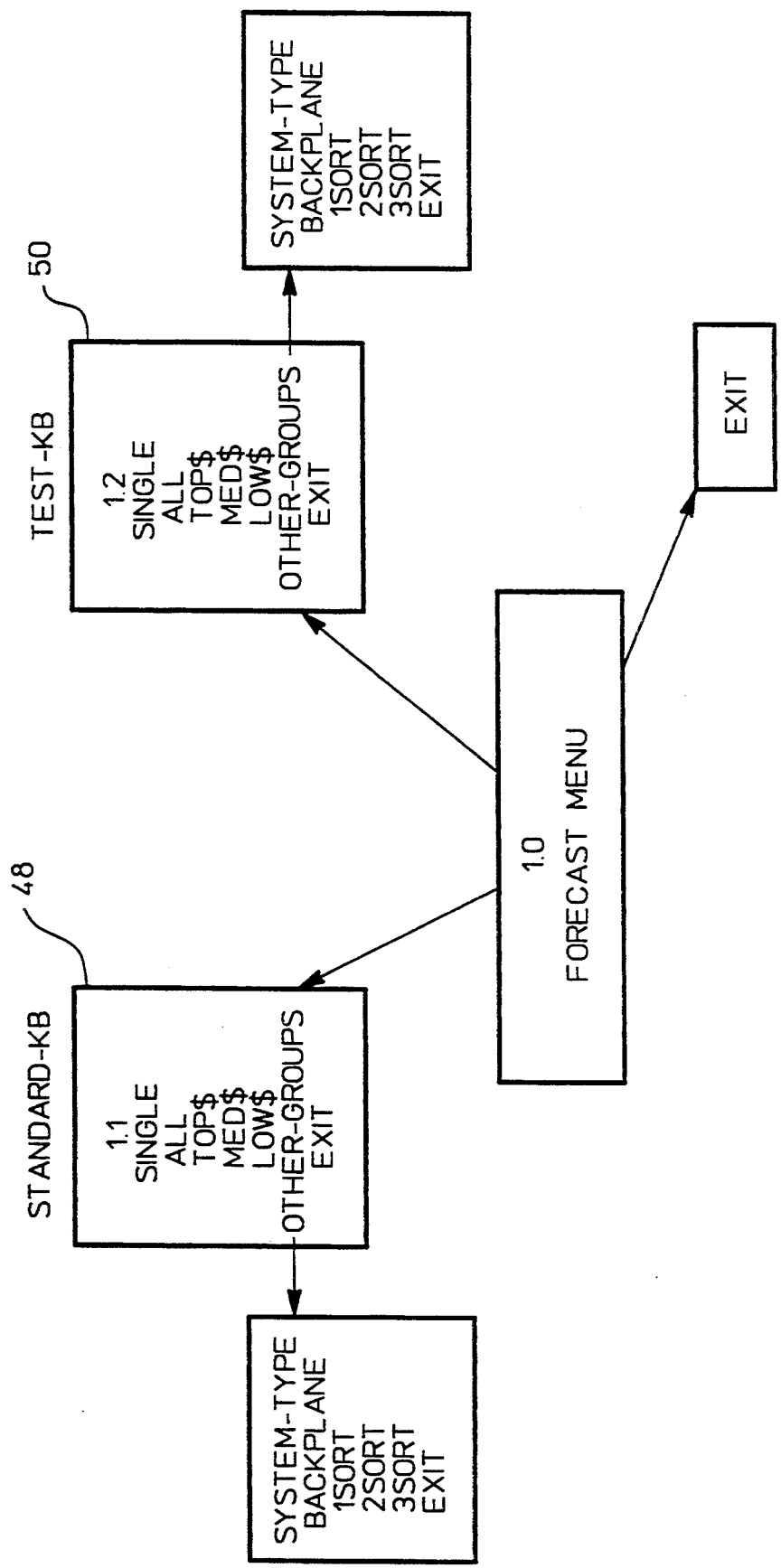
FIG. 3 is a schematic diagram showing a functionality mapping of the forecast screens.
Figure 5:
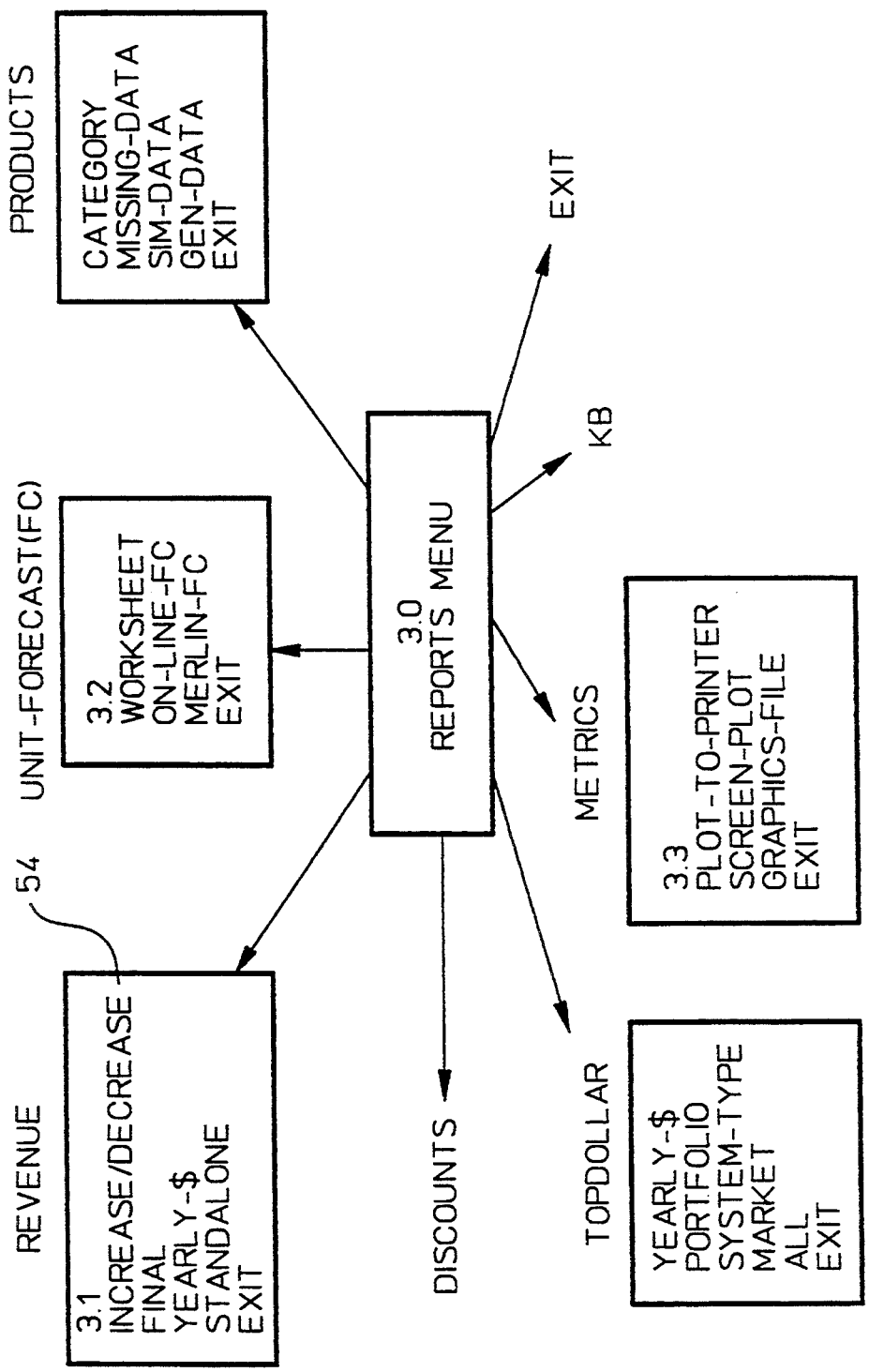
FIG. 5 is a schematic diagram showing a functionality mapping of the reports screens.
Figure 13:
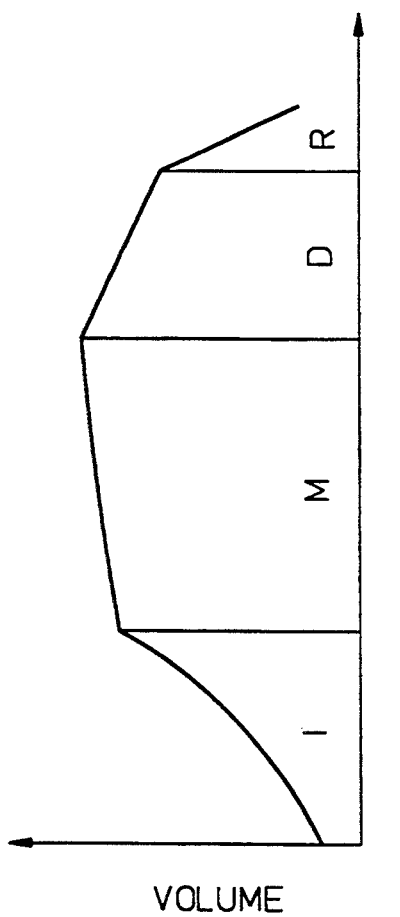
FIG. 13 shows a conventional life cycle curve for a typical product, and indicates the abbreviations used to identify specific portions of such a curve.

The user interface includes customized menu-type screens that drive five major functional areas: (1) knowledge base (KB) functions 30 which allow for knowledge base modifications and structure analysis through; (2) forecasting functions 32 which run product forecasting (see 48 in FIG. 3) and simulation scenarios (see 50 in FIG. 3); (3) database functions 34 which allow database update and query capabilities; (4) report functions 36 which run many different types of forecast reports (see 54 in FIG. 5 and its related report of FIG. 10); and (54 graphs functions 38 which generate various forms of display of the forecasting metrics. The present forecasting system was designed to co-exist with conventional business computer systems, without having to alter them. Thus, even though the so-called Merlin system operates in a completely different hardware and operating system environment than the business systems, the invention allows the forecasting to work with the business systems in a seamless manner. In other words, the actual product order information (e.g., product #, product option, distribution market, unit volumes-current, unit volumes-historical, net revenue) is automatically downloaded in a conventional file such as an ASCII file from a sales order system 40 to the Merlin system on a periodic basis, and the forecasting results are uploaded in a conventional file such as an ASCII file to the a planning system 42. All of the necessary communications thus occur via standardized files typically transferred over a factory's local area network (LAN).

Figure 4:
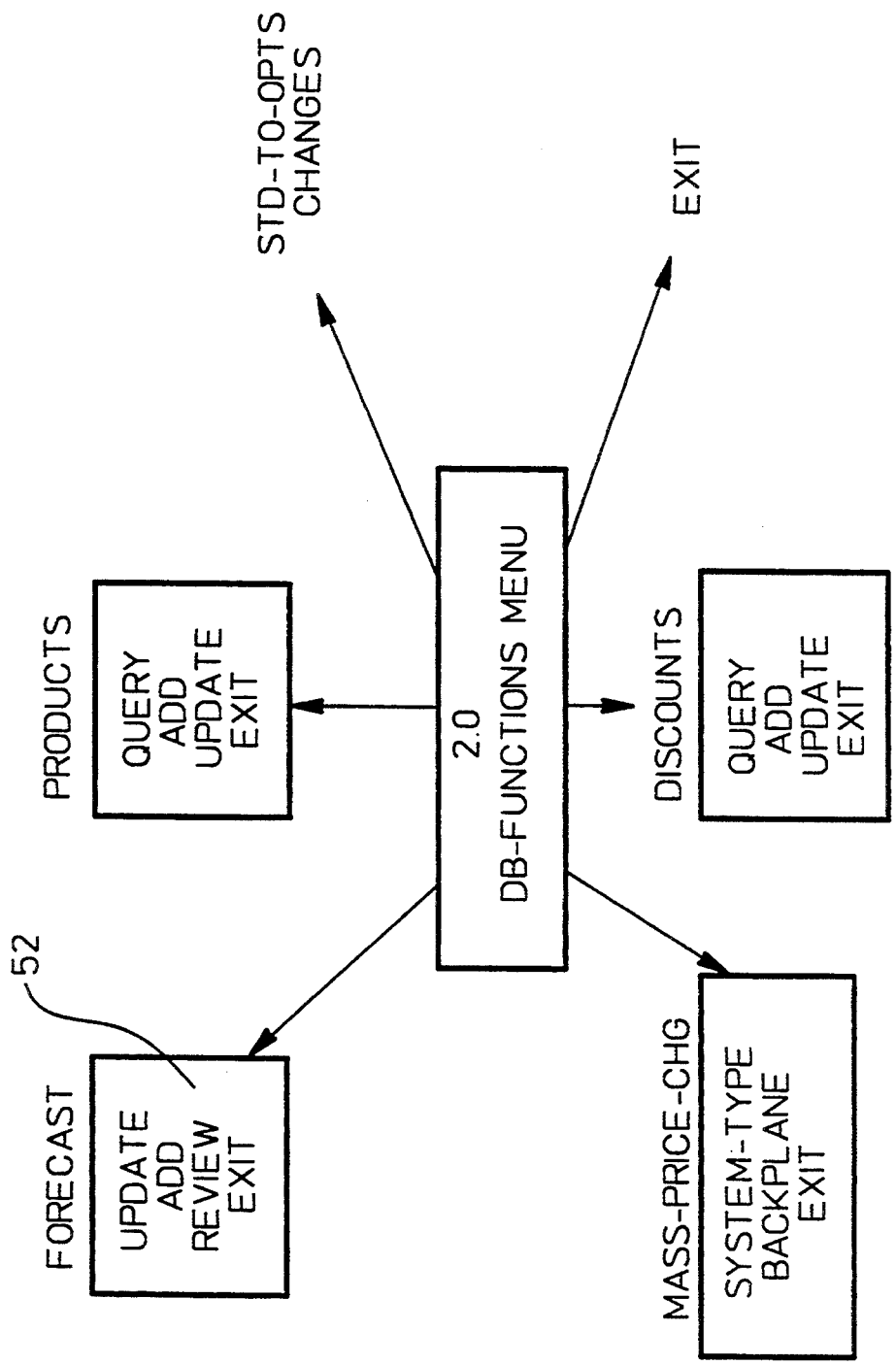
FIG. 4 is a schematic diagram showing a functionality mapping of the database screens.

In the preferred form, the relational database 26 holds all the necessary product and forecast information as well as order history and forecast results. The database is organized so it can provide to users an efficient and convenient way of storing important information about products in the factory. The database is uniquely designed so that all product information necessary for making a forecast (the information that changes during every monthly forecast cycle) is stored by date. The unique database in effect stores all status information for each individual product and each group of products which was known at the time each forecast was made. This status information includes the known historical product information and the known future product information (see FIG. 19). This enables a forecast analyst to review the results of past forecasts (see 52 in FIG. 4, and see FIG. 9). Keeping all of this information increases the size of the database, but is necessary to provide the same driving data for a simulation forecasting run as was available during the original forecasting run.

Figure 18:
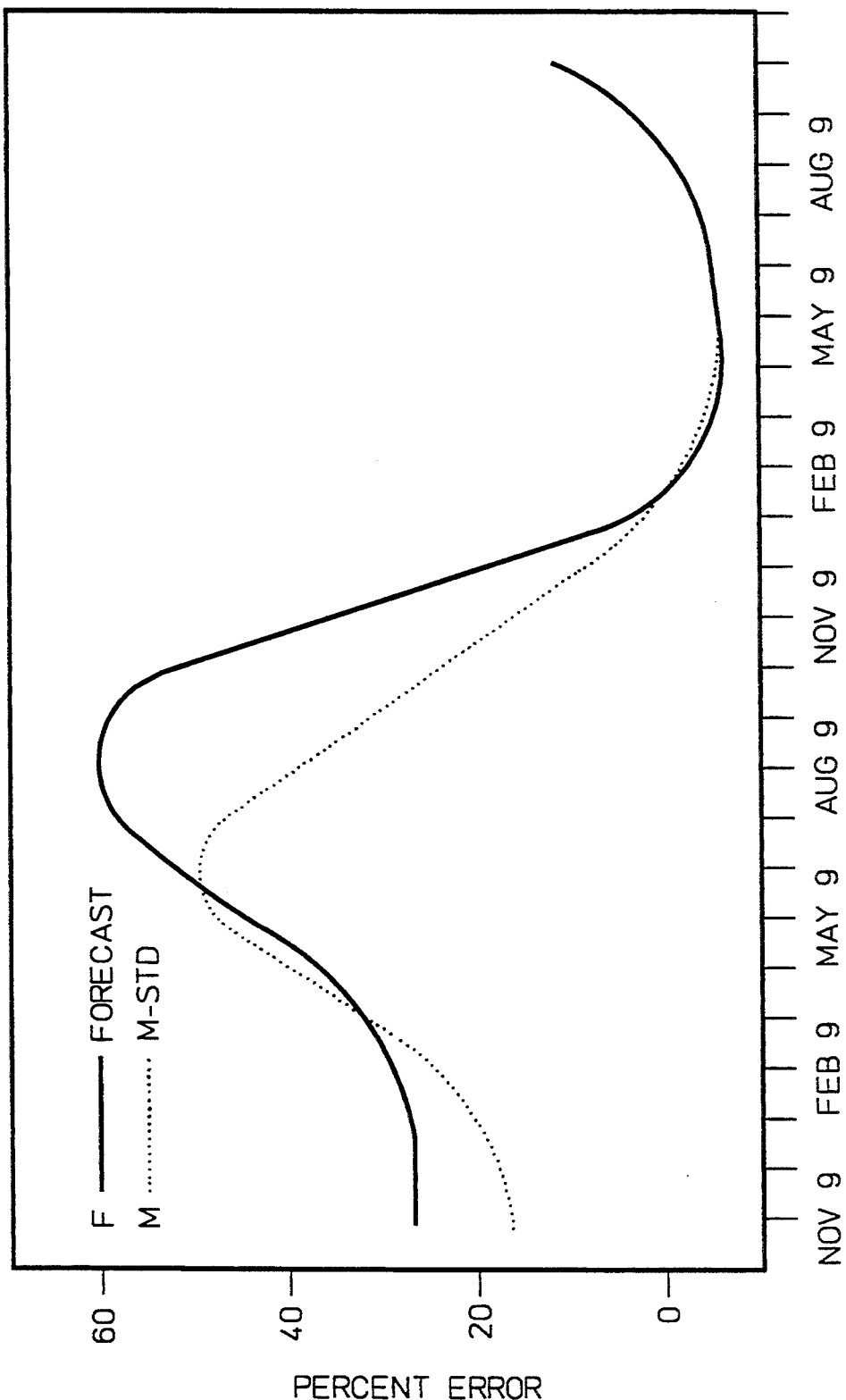
FIG. 18 shows an exemplary graphical plotting in smoothed form showing the percent forecast error for an individual forecaster as compared to the percent forecast error for the so-called Merlin system for the same twenty four month period.

The database also separates an actual final forecast 44 made by the forecaster from the predictions in a standard forecast 46 produced by the Merlin program. In other words, the individual forecaster can still use one of the input screens to modify the Merlin forecast in order to take into account any additional objective or subjective factors relating to the future product demand. In this way, forecast accuracy for all techniques can be determined by comparison to actual orders received, such as the comparison graph of FIG. 18.

The knowledge base software provides the tools necessary to create, communicate with, and run knowledge bases. This invention contains two knowledge bases: the standard knowledge base 20 and the test knowledge base 22. The standard KB holds the present working set of knowledge about analyzing and predicting a forecast. The test or simulation KB is similar to the standard KB; however, it is here that the new forecasting ideas are tested. The inference engine processes the standard KB or simulation KB for forecasting or forecast simulation, respectively.

The knowledge bases of the present Merlin system are composed primarily of forward-chaining demons. Backward chaining also occurs making production rules an integral part of the KB structure. An example of a forward-chaining price change demon is shown in Table I below:

TABLE I

```
price chg demon8:
    when
        dollar category - top and
        product category - old with no system forecast and
        price chg - large
    then
        reassert forecast = forecast - (current orders * 0.15).
        reassert pc adjust =-(current orders * 0.15).
    if
        tracing
    then
        message file = "/tmp/merlin/out/rules.fired",
            combine ("price chg demon8  :FC-",
            forecast).
    endif.
```

TABLE I-continued

```
    obtain next month price chg.
endwhen
(why:   "If the price chg of this month is large, then
        decrement the", "forecast by 15%. of this months
        previously predicted orders. These", "orders get
        pulled up to increment the previous months
        forecast.").
```

By having the tracing "on", all of the steps taken to achieve the forecast result are recorded for debugging or other analysis. The "dollar category" and "product category" guard attributes are found directly from the input attributes for this particular product. But the "price chg" guard attribute must be obtained by the following backward chaining rule in Table II:

TABLE II

```
price chg degree rule8:
    if
        price chg pcnt gt 4 and
        price chg pcnt le 6
    then
        price chg = large.
    endif.
```

The KB logic firing occurs as follows. The demon guard attributes are checked for truth, one at a time. If a guard attribute is an input attribute (see FIG. 16), then the inference checks the value. If a demon guard attribute is an inferred attribute, then the inference engine backward chains to obtain the value. When all of the guard attributes are true, then the demon "fires" and asserts appropriate conclusions. Of course, the results of this firing can change guard attributes in other demons, thus causing forward chaining and subsequent firing of other demons. Eventually the final forecasting value for a particular product for a particular month is determined and that value is entered in the database. It is to be understood that the input attributes and the inferred attributes are by way of example only. Similarly the choice of rules and demons, whether forward or backward chaining are also a matter of choice, and the invention contemplates various types and collections of attributes, rules and demons, all depending on the products involved and the factors considered to be pertinent in forecasting the future demand for such products.

The knowledge base functionality is embedded, meaning that the code to run the expert system is actually compiled with all the rest of the system code (all source code eventually compiles to C object code). The great advantage with this capability is increased performance.

Since the present invention is particularly designed for forecasting large numbers of individual products (e.g., 500), forecast analysis needs to be accomplished without interaction from the users. Thus, the typical repetitive interaction found in many expert systems through using questions and answers is not deemed practical for the achieving the goals of the present invention. To feed the expert system with information, data is automatically queried from the database. All general product information (see FIG. 6) and special product information (see FIGS. 7 and 8) needed by the Merlin system to make a forecasting decision which cannot be automatically loaded into the database is put into the database by the forecasters in a real-time manner through the access screens of FIGS. 7 and 8). All of this data is used to drive the expert system.

The present Merlin system generates many reports for the user community. All reports can be generated on a stand-alone basis (see FIG. 11) or by various types of product groupings (see FIG. 12). Some reports are used for management information while others are used for forecast reasonableness checking.

Graphics on forecast metrics are generated by the statistical software package. This software can be called from the main Merlin system and provides graphic plots to track forecast accuracy. This functionality is called from the simple use of menu keys, such that the users don't realize they have called another powerful system. This integration gives the user interface a one-product look and feel.

In order to understand how well the system is performing, various metrics on forecast accuracy are produced. Among these are percent error and forecast vs. actual for individual products, as well as average percent forecast errors for product groupings. The grouped average forecast errors can be weighted by total units or by total revenue generated. Further, each graph can display the errors for how the Merlin standard KB predicted vs. how the Merlin simulation KB predicted. In this way, rapid feedback during analysis is obtained.

In producing a product forecast, Merlin uses past order history data as well as product information supplied by the forecasters to drive the expert system. There are multiple main categories of products based on a product's annual revenue, such as top and low, or top, medium and low, or the like. Since many of the products generate only a small percent of factory revenue, the forecast analysts do not want to spend much time in producing these forecasts. For these products, in the preferred form, only history data is used to generate forecasts. The Merlin system typically performs two history screening passes to handle exceptional values and then performs a moving average statistic on the smoothed data. Forecasting heuristics are coded in C for maximum performance. Nothing hinders the forecasters from entering special information for one of these products. This will cause the expert system to further manipulate the forecasts for increased accuracy.

For top revenue products, special information such as product life cycle, price changes, and big deals are always kept up to date. The fundamental principle is the more knowledge about factors that affect the forecast, the more accurate the forecast will be. The standard KB is used for this process. It is cycled through twelve times because a complete analysis is done for every monthly forecast for the year out. All products are forecasted in a few hours at the beginning of every month. This process previously took almost an entire month. As the month progresses, the forecaster can rerun forecasts as new information becomes available. Before the monthly forecasts are finalized, the forecasters have the ability to manually adjust any forecast and thus, have ultimate control of the final result.

The Merlin has built-in simulation capability so that the forecasting process can be analyzed and improved to meet the objective of improving forecast accuracy. Demons and/or rules in the simulation KB are modified to test the effect on forecast accuracy. Then a simulation is run over the last year for one or more products to generate forecast results using the simulation KB's. Finally, forecast metrics are analyzed to compare the results of the standard and simulation KB's. If the simulation KB proves to forecast more accurately, then it is rolled over to become the new standard. With the ability to run "what-if" experiments, the forecasters have a tool that enables them to actually improve the way in which they forecast. It also gives them more time to collect important information necessary for predicting as accurately as possible.

It will be understood by those skilled in the art that the aforementioned invention provides many benefits to the factory because of increased forecast accuracy. One major benefit is a reduction in parts inventory. More intangible benefits are enhanced throughput and productivity, fewer production holds and cancellations, and a decrease in late shipments. These result in increased customer satisfaction. The expert system also documents valuable expertise and enhances skill transfer when a new forecast analyst commences work.

It will be appreciated that various changes and modifications can be made without departing from the spirit and scope of the invention as defined by the following claims.

We claim:

1. A forecasting system for predicting demand for products produced by a manufacturing line, the forecasting system comprising:

a database for storing information related to the volume of orders for products produced by the manufacturing line, wherein there is a plurality of types of products produced by the manufacturing line;

a knowledge base for storing rules relevant to forecasting demand for the products produced by the manufacturing line;

a test knowledge base for storing proposed rules for forecasting demand for the products produced by the manufacturing line; and a program interface, coupled to the data base, the knowledge base and the test knowledge base, for providing a user interface to the database, the knowledge base and the test knowledge base, the program interface including generating means, coupled to the data base and the knowledge base, for generating forecasts of the future product demand for the products based on the rules stored in the knowledge base and the information stored in the data base, displaying means, coupled to the generating means, for displaying the forecasts generating by the generating means, simulation means for allowing generation of test forecasts using the proposed rules stored in the test knowledge base operating upon the information stored in the database, and updating means, coupled to the data base and the knowledge base, for updating the database and for updating the rules stored in the knowledge base, wherein updating the rules results in changing the forecasts generated by the generating means.

2. The forecasting system of claim 1 wherein the database includes storage means for storing forecasts made for future product demand and for storing the related product data used to make such forecasts.

3. The forecasting system of claim 1 wherein the knowledge base stores standard rules used by the generating means to generate forecasts of the future products, and the test knowledge base stores simulation rules which are used to simulate forecasting scenarios.

4. A method of using a knowledge base to forecast product demand for products produced in a manufacturing environment, including the steps of:

(a) collecting in a computer database, sales volume information for the products;

(b) generating a reference forecast for the product demand using the sales volume information for the products collected in step (a) and using a first set of rules within a knowledge base;

(c) storing the reference forecast; and, (d) generating a test forecast for the product demand using the sales volume information for the products collected in step (a) and used in step (b) to generate the reference forecast, the test forecast being generated using a second set of rules within the knowledge base.

5. A method as in claim 4 additionally comprising the step of:

(e) comparing the reference forecast and the test forecast to actual product orders received in order to determine which of the reference forecast and the test forecast was a more accurate forecast.

6. A method as in claim 5 additionally comprising the step of:

(f) when the comparison in step (e) indicates that the test forecast was the more accurate forecast, using the second set of rules to generate future reference forecasts.

7. A method as in claim 4 additionally comprising the steps of:

(e) storing the test forecast; and, (f) comparing the reference forecast and the test forecast to actual product orders received in order to determine which of the reference forecast and the test forecast was a more accurate forecast.

8. A method as in claim 7 additionally comprising the step of:

(g) when the comparison in step (f) indicates that the test forecast was the more accurate forecast, using the second set of rules to generate future reference forecasts.

* * * * *